UNITED STATES PATENT OFFICE.

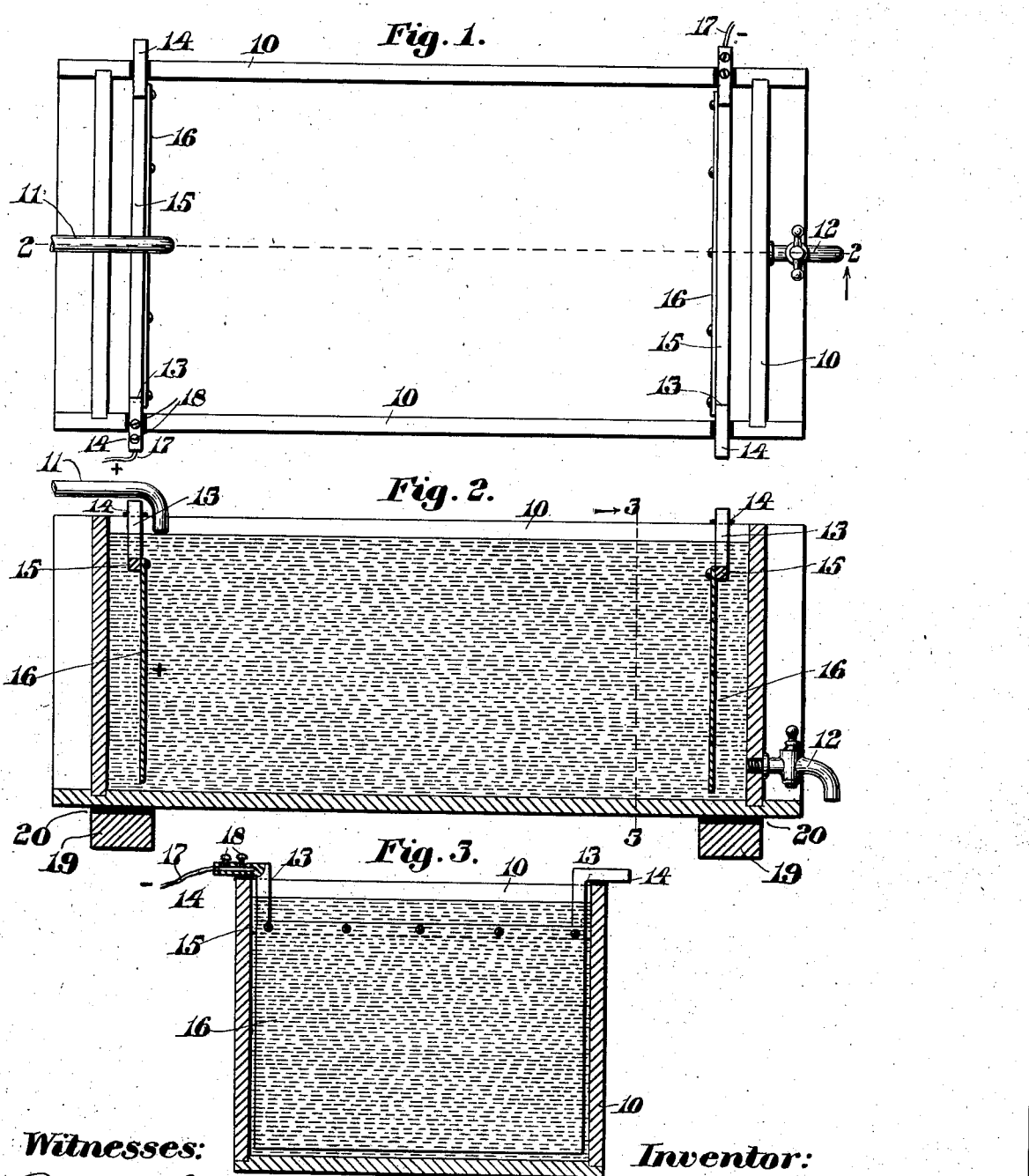

GEORGE D. BURTON, OF BOSTON, MASSACHUSETTS.

METHOD OF TREATING COTTON.

No. 827,293.　　　　Specification of Letters Patent.　　　　Patented July 31, 1906.

Application filed November 20, 1905. Serial No. 288,171.

*To all whom it may concern:*

Be it known that I, GEORGE D. BURTON, a citizen of the United States of America, and a resident of Boston, in the county of Suffolk and State of Massachusetts, have invented certain new and useful Improvements in Methods of Treating Cotton and Cotton Fabrics, of which the following is a specification.

This invention relates to methods of treating cotton, cotton fabrics, and similar materials to cause them to attain an appearance and feeling similar to wool.

The invention consists in providing in a suitable tank, vat, or other receptacle a bath of water to which sufficient sodium carbonate is added, thus forming a solution capable of producing electrolytic gases into which may be immersed a quantity of wool for the purpose of cleansing and degreasing the same and then immersing in said solution a quantity of cotton, cotton fabrics, or similar materials to cause the same to absorb from the solution a certain amount of grease, thereby giving the cotton or other material an appearance and feeling similar to that of wool.

In the operation of the invention a tank or vat is used similar to that shown in the drawings forming part of this application, of which—

Figure 1 represents a plan view. Fig. 2 represents a longitudinal section thereof on line 2 2 on Fig. 1, and Fig. 3 represents a section on line 3 3 on Fig. 2 looking in the direction of the arrow.

Similar characters designate like parts throughout the several figures of the drawings.

In the drawings, 10 represents a tank or vat of any ordinary construction provided with an inlet-pipe 11 for supplying water thereto and a faucet or cock 12 for withdrawing the solution from said tank when desired. A bent aluminium rod 13 crosses the upper end of the tank 10, and the ends 14 thereof are supported by the sides of said tank, while the main cross member 15 thereof depends into said tank and extends from side to side thereof. This cross member is usually constructed of aluminium or some other similar light conducting metal. Secured to this cross member 15 and extending nearly to the bottom of said tank is a thin metallic plate 16, forming a suitable electrode. The member 13 is provided with a conducting-wire 17, secured thereto by means of set-screws 18. At the opposite end of said tank is a similar electrode. A current of electricity from any suitable source is caused to pass from one electrode to the other through the bath contained within said tank. This bath consists of water which is kept at a level above the upper ends of the electrodes 16, the supply being obtained through the inlet-pipe 11. To this bath is added a sufficient quantity of chemical salts, such as sodium carbonate, to produce a suitable working solution. When it is desired to secure a more rapid action, the gravity of the bath is increased to about 1.015 or 1.020, more or less, by the addition of a quantity of chlorid of sodium in the proportion of about one part chlorid of sodium to two parts sodium carbonate. The temperature of the solution contained within the tank is then raised either by steam, gas, electricity, or other suitable means of heating to about 80° Fahrenheit. When a current of electricity is permitted to pass through the solution from one electrode 16 to the other, it causes the production of an electrolytic gas. If wool or woolen fabrics are then immersed in the solution, the creation of gas will act thereon to open, expand, and strengthen the fibers of said wool and cause a most effectual cleansing thereof, giving the material a soft and velvet feeling. When the dirt and grease has been thoroughly eliminated from the wool thus immersed, it is removed from the bath and the solution drawn off into a separate vat and allowed to settle to free said bath from any impurities which may reside therein. The solution after settling may then be pumped back into the first-mentioned tank and supplied with an equal quantity of raw cotton. This cotton is permitted to remain in the solution in which the wool has been degreased and cleansed for about fifteen or twenty minutes, during which time a current of electricity is permitted to pass through the solution and the cotton contained therein. When this has been done, the cotton takes on the appearance of wool, absorbing a certain amount of the wool grease and animal matter and giving to said cotton an appearence and feeling of wool. The cotton thus treated may be then mixed with wool and the mixed material carded and spun into yarns to be used in the manufacture of stockings, cloths, carpets, &c., or the cotton thus treated may be used separately in the manufacture of such goods. This mixed thread has an increased strength, and two threads of cotton after the treatment by this process, when used in connection with one of wool, is about equal to two threads of wool and one of untreated cotton when used for manufacturing purposes, thus causing a great saving in the cost of raw material in the manufacture of a given quantity of goods. It is obvious that in the case of cotton we have a vegetable fiber and in wool animal fiber, and by this invention the vegetable fiber is so converted as to perform the function of animal fiber to a greater or less extent. After the goods have passed through this method of treatment they are perfectly soft and pliable and at the same time uninjured by the action thereon of the solutions in which they have been immersed. The fibers are strengthened, will last longer, and wear better than the same fibers will do when untreated.

It has been found by experiments that cotton subjected to this treatment has a greater tensile strength even when of less diameter than cotton untreated and that it may be spun two numbers finer than it has heretofore been found feasible to spin either cotton or wool. At the same time the creation of electrolytic gas or gases destroys all bugs, germs, microbes, bacteria, &c., which are sometimes found in the wool and cotton and other fabrics being treated.

A direct current of electricity is usually employed, which may be obtained from any suitable source varying from seventy-five volts to five hundred volts and from five amperes to five hundred amperes, according to the size of the receptacle used and the quantity of material to be treated.

After the cotton has been treated in a solution containing the wool grease quantities of this material have been taken with an equal amount of wool and have been spun into yarn and manufactured into stockings. This cotton yarn after treatment has been spun on wool-spinning machinery, which so far as is known has not heretofore been accomplished, and it has been found by experience that where half cotton and half wool are used in this manner the yarn is better, softer, and stronger and will wear longer.

In warm climates and on days when the heat is extreme the temperature of the solution will be sufficient without the necessity of heating by artificial means.

It is believed that from the foregoing the operation of the invention will be thoroughly understood without any further description.

Having thus described my invention, I claim—

1. The process of treating cotton and other similar materials, which consists in immersing said material in a bath in which wool has been degreased and cleansed, adding to said bath a quantity of sodium carbonate, heating the solution, and then passing through said bath a current of electricity while said material is immersed therein.

2. The process of treating cotton and other similar materials, which consists in immersing said material in a bath in which wool has been degreased and cleansed, adding to said bath a solution about one part chlorid of sodium to about two parts soda carbonate, heating the solution, and then passing through said bath a current of electricity while said material is immersed therein.

3. The process of treating cotton and other similar materials, which consists in immersing said material in a bath in which wool has been degreased and cleansed, adding to said bath a quantity of sodium carbonate, and then passing through said bath a current of electricity while said material is immersed therein.

4. The process of treating cotton and other similar materials, which consists in immersing said material in a bath in which wool has been degreased and cleansed, adding to said bath a solution about one part chlorid of sodium to about two parts soda carbonate, and then passing through said bath a current of electricity while said material is immersed therein.

5. The process of treating cotton and other similar materials, which consists in immersing wool in a bath containing a quantity of sodium carbonate, heating the solution, passing through said bath a current of electricity while said wool is immersed therein, drawing said solution into a vat and permitting it to settle, returning said solution into the original vat, immersing therein an equal amount of cotton, heating the solution, and passing through said bath a current of electricity while said cotton is immersed therein.

6. The process of treating cotton and other similar materials, which consists in immersing wool in a bath containing a quantity of sodium carbonate, passing through said bath a current of electricity while said wool is immersed therein, drawing said solution into a vat and permitting it to settle, returning said solution into the original vat, immersing therein an equal amount of cotton, and passing through said bath a current of electricity while said cotton is immersed therein.

7. The process of treating raw cotton which consists in immersing it in a bath containing animal grease from wool and adding thereto a quantity of sodium carbonate and then passing through said bath a current of electricity while said cotton is immersed therein.

8. The process of treating raw cotton which consists in immersing it in a bath containing animal grease from wool and chemicals for strengthening its fiber, and subjecting the cotton so immersed to the action of an electric current to cause said cotton to absorb the wool grease and thereby become softened, with its yarns of less diameter and of greater tensile strength.

9. The process of treating cotton, which consists in placing said cotton in a suitable receptacle containing a solution composed of water, chemical salts, and animal grease, and passing through said solution and the cotton contained therein a current of electricity.

10. The process of treating cotton, which consists in placing said cotton in a suitable receptacle containing a solution composed of water, chemical salts, and animal grease, and passing through said solution and the cotton contained therein a current of electricity, said current of electricity being of sufficient pressure and volume to create in said solution electrolytic gas or gases.

11. The process of treating cotton, which consists in placing said cotton in a suitable receptacle containing a solution composed of water, chemical salts, and animal grease, and passing through said solution and the cotton contained therein a current of electricity, thereby causing the vegetable fiber of which the cotton is composed to absorb the animal grease or oil contained in said solution.

Signed by me at Boston, Massachusetts, this 6th day of October, 1905.

GEO. D. BURTON.

Witnesses:
EDNA C. CLEVELAND,
WALTER E. LOMBARD.